United States Patent
Kuramochi

(10) Patent No.: US 10,233,888 B2
(45) Date of Patent: Mar. 19, 2019

(54) IDLE STOP OPERATION IN RESPONSE TO STEERING INPUT

(71) Applicant: HONDA MOTOR CO., LTD., Tokyo (JP)

(72) Inventor: Toshikatsu Kuramochi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/706,823

(22) Filed: Sep. 18, 2017

(65) Prior Publication Data

US 2018/0080426 A1    Mar. 22, 2018

(30) Foreign Application Priority Data

Sep. 21, 2016 (JP) ................................. 2016-183988

(51) Int. Cl.
| | | |
|---|---|---|
| *B62D 5/04* | (2006.01) | |
| *F02N 11/08* | (2006.01) | |
| *B62D 15/02* | (2006.01) | |
| *B62D 5/00* | (2006.01) | |

(52) U.S. Cl.
CPC .......... *F02N 11/0822* (2013.01); *B62D 5/001* (2013.01); *B62D 5/005* (2013.01); *B62D 5/046* (2013.01); *B62D 15/022* (2013.01); *F02N 2200/0808* (2013.01)

(58) Field of Classification Search
CPC .. F02N 11/0822; F02N 11/084; F02N 11/106; F02N 2019/008; F02N 2200/0808; B62D 15/022; B62D 15/021; B62D 5/046; B62D 5/0466

USPC .......... 123/179.3, 179.4; 73/114.58, 114.59, 73/114.61; 701/113, 41

See application file for complete search history.

(56) References Cited

U.S. PATENT DOCUMENTS

| | | | | |
|---|---|---|---|---|
| 7,004,278 | B2* | 2/2006 | Sugitani | B62D 6/008 180/402 |
| 9,043,123 | B2* | 5/2015 | Urabe | B60W 10/20 701/112 |
| 9,249,771 | B2* | 2/2016 | Kamiya | F02N 11/0833 |
| 9,573,617 | B2* | 2/2017 | Shibuya | B60W 10/02 |
| 2014/0229067 | A1* | 8/2014 | Gibson | B62D 5/0481 701/41 |

(Continued)

FOREIGN PATENT DOCUMENTS

| | | |
|---|---|---|
| JP | 2005351202 A | 12/2005 |
| JP | 2014205474 A | 10/2014 |

*Primary Examiner* — Hai H Huynh
*Assistant Examiner* — Gonzalo Laguarda
(74) *Attorney, Agent, or Firm* — Armstrong Teasdale LLP

(57) ABSTRACT

In a steer by wire and idle stop vehicle, the idle stop is terminated if the steering wheel (11) is turned by more than a prescribed threshold value. For the purpose of preventing consumption of power by a steering actuator and preventing an unexpected steering action upon termination of the idle stop, the engine restart threshold value (Δθth) is varied depending on the direction of the change of the steering angle from the start of the idle stop operation. In particular, if the change (Δθ) of the steering angle is in the direction to increase the steering angle from the value (θs) at the start of the idle stop operation, the engine restart threshold value is raised. If the change of the steering angle is in the direction to decrease the steering angle from the value at the start of the idle stop operation, the engine restart threshold value is lowered.

6 Claims, 5 Drawing Sheets

(56) References Cited

U.S. PATENT DOCUMENTS

2016/0069317 A1* 3/2016 Koibuchi ............ F02N 11/0833
　　　　　　　　　　　　　　　　　　　701/112

* cited by examiner

IDLE STOP OPERATION IN RESPONSE TO STEERING INPUT

TECHNICAL FIELD

The present invention relates to a vehicle control system, and in particular, to a vehicle control system for a vehicle incorporated with a steer by wire device and configured to perform an idle stop operation.

BACKGROUND ART

Currently marketed passenger vehicles are often equipped with a steer by wire steering device in which front wheels are mechanically decoupled from a steering wheel, and steered by a steering actuator in response to operation of the steering wheel. In a steer by wire steering device, a steering unit having a steering actuator for turning the front wheels and an operating unit including a reaction force actuator for applying a steering reaction force to a steering wheel are provided. In order to allow the steering operation to be performed at the time of a failure, the steering unit and the operating unit can be connected to each other via a clutch which is normally disengaged but can be engaged when required.

In a vehicle equipped with a steer by wire steering device, if the steering wheel is turned while the vehicle is stationary, a steering unit produces a relatively large steering torque, and the operating unit also produces a correspondingly large reaction force so that the steering device consumes a large amount of electric power. If the vehicle is an idle stop vehicle, the alternator of the vehicle produces no electric power during an idle stop operation. Therefore, it is desirable in an idle stop vehicle to prevent excessive power consumption by the steering device when the vehicle is stationary. It is therefore known to drive the steering actuator with a smaller power or stop the operation of the steering actuator while the clutch is kept engaged and the reaction force actuator is allowed to operate normally during an idle stop operation. See [0282] to and FIG. 17 of JP2014-205474A.

According to another conventional solution to this problem in an idle stop vehicle provided with a steer by wire steering device, the idle stop operation is terminated (or the engine is restarted) when the steering angle is increased beyond a prescribed threshold value. In order that the restarting of the engine may be completed before the steering wheel is turned to the maximum steering angle, the prescribed threshold value of the steering angle is determined as a value equal to the maximum steering angle minus the product of the steering angular speed and the time required for the restarting of the engine. See JP2005-351202A.

SUMMARY OF THE INVENTION

According to the prior art disclosed in JP2014-205474A, the power consumption during an idle stop operation can be reduced, but if the steering wheel is turned while the vehicle is in the idle stop operation, the relationship between the steering angle of the steering wheel and the actual steering angle of the road wheels may deviate from the normal setting. More specifically, if the steering wheel is turned by a certain angle during an idle stop operation, as the steering angle of the road wheels remains fixed during the idle stop operation, as soon as the idle stop operation is terminated, the steering device causes the road wheels to be abruptly turned to an angle corresponding to the steering angle of the steering wheel. Therefore, if the steering wheel is turned during an idle stop operation, there may be an unexpected change in the steering angle of the road wheels upon termination of the idle stop operation. For this reason, the driver of a vehicle may experience an undesired impression when an idle stop operation is started while the road wheels are steered by a certain angle.

The inventor of this application has noted that this deviation or shifting in the relationship between the steering angle of the road wheels and the steering angle of the steering wheel can occur in two different modes. In the first mode, the steering wheel is turned during an idle stop in the same direction as the steering angle of the road wheels at the start of the idle stop operation. In the second mode, the steering wheel is turned during an idle stop operation in the opposite direction to the steering angle of the road wheels at the start of the idle stop operation. In the first mode, because the vehicle operator typically has an intention to steer in the same direction as the steering angle of the road wheels, and the steering angle of the road wheels increases upon termination of the idle stop operation, the vehicle operator typically does not experience any unfamiliar impression. On the other hand, in the second mode, the steering angle of the road wheels decreases upon termination of the idle stop operation against the possible intention of the vehicle operator so that the vehicle operator is likely to experience some unfamiliar impression.

In view of such problems of the prior art, a primary object of the present invention is to provide a vehicle control system that prevents undesired power consumption in a steer by wire steering device when the vehicle is in an idle stop operation, and also prevents any unfamiliar impression when restarting the vehicle after an idle stop operation.

To achieve such an object, the present invention provides a control system (40) for a vehicle (1) incorporated with a steer by wire steering device (10) for steering a road wheel (3) mechanically decoupled from a steering member (11) by using a steering actuator, the control system comprising: an idle strop control unit (41) for starting an idle stop operation to stop an engine mounted on the vehicle when a prescribed idle stop condition is satisfied, and restarting the engine (4) when a prescribed restart condition is satisfied; a steering input angle sensor (31) for detecting a steering input angle ($\theta$) of the steering member; an actuator control unit (44) for controlling the steering actuator so as to cause the road wheel to be steered at an angle commanded by the steering input angle of the steering member, the actuator control unit being configured to terminate an operation of the steering actuator during the idle stop operation started by the idle stop control unit; and a steering output angle sensor (33, 35) for detecting a steering output angle of the road wheel; wherein the restart condition includes a change ($\Delta\theta$) of the steering input or output angle ($\theta$) from a start of the idle stop operation being greater than an engine restart threshold value ($\Delta\theta th$); and wherein, if an absolute value of the steering input or output angle ($|\theta s|$) at the start of the idle stop operation is equal to or greater than a prescribed value, the engine restart threshold value for a steering operation to increase the steering input angle is given as a first value, and the engine restart threshold value for a steering operation to decrease the steering input is given as a second value smaller than the first value.

According to this arrangement, when the driver of the vehicle should turn the steering wheel while the vehicle is stationary in an idle stop operation, the idle stop operation is terminated if the change of the steering input angle from a start of the idle stop operation is greater than an engine restart threshold value, and this engine restart threshold value is varied depending on the direction of the change of the steering input angle from the start of the idle stop operation.

If the change of the steering input angle is in the direction to increase the steering angle from the value at the start of the idle stop operation, the engine restart threshold value is raised. This is advantageous because the driver of the vehicle is likely to anticipate an increase in the steering angle upon termination of the idle stop operation, and the saving of electric power consumption by the steering actuator can be maximized. Conversely, if the change of the steering input angle is in the direction to decrease the steering angle from the value at the start of the idle stop operation, the engine restart threshold value is lowered. This is advantageous because the driver of the vehicle is not likely to anticipate a decrease in the steering angle upon termination of the idle stop operation, and is thereby prevented from experiencing any undesired impression although the saving of electric power consumption by the steering actuator can be slightly decreased.

If the absolute value of the steering input or output angle at the start of the idle stop operation is smaller than the prescribed value, the engine restart threshold value may be given as a base value intermediate between the first value and the second value.

If the absolute value of the steering input or output angle at the start of the idle stop operation is relatively small, the driver of the vehicle is not likely to be annoyed by the steering behavior of the vehicle upon termination of an idle stop, there may be no need to consider the steering angle at the start of the idle stop operation in determining the engine restart threshold value, and a relatively large value may be assigned to the engine restart threshold value without any problem.

According to a preferred embodiment of the present invention, the first value and the second value are fixed values without regard to the absolute value of the steering input or output angle at the start of the idle stop operation.

Thereby, the system configuration can be simplified.

More preferably, the first value increases with an increase in the absolute value of the steering input or output angle at the start of the idle stop operation, and/or the second value decreases with an increase in the absolute value of the steering input or output angle at the start of the idle stop operation.

Thereby, the transition in the behavior of the steering device can be made smoother.

Typically, the idle strop control unit does not start the idle stop operation if the absolute value of the steering input or output angle is greater than a limit value which is greater than the prescribed value.

Thus, by preventing the idle stop operation from being started when the absolute value of the steering input or output angle is significantly great, the steering device is prevented from behaving in an unexpected way in a highly reliable manner.

Thus, according to the present invention, it is possible to provide a control device for a vehicle that can prevent undesired power consumption in a steer by wire steering device when the vehicle is in an idle stop operation, and also can prevent the driver of the vehicle from experiencing any unfamiliar steering impression when the vehicle is restarted upon termination of an idle stop operation.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
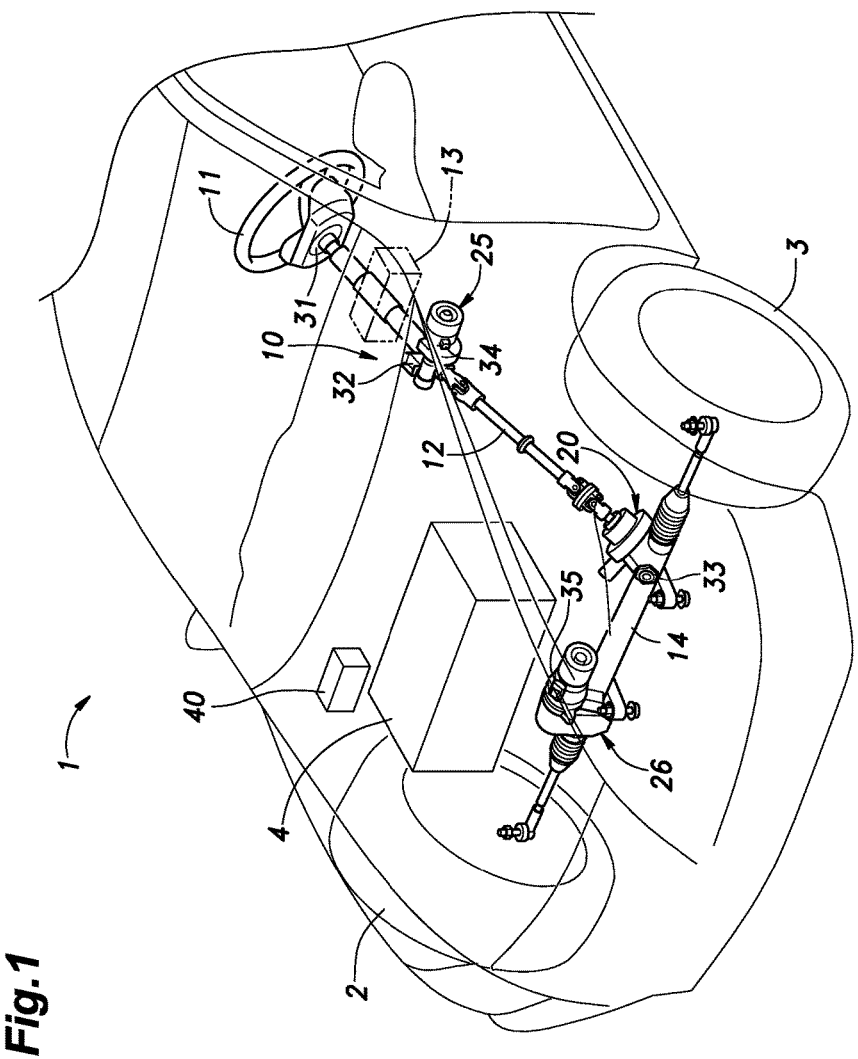
FIG. 1 is a see-through schematic perspective view of a front part of a vehicle according to an embodiment of the present invention.

FIG. 1 is a see-through schematic perspective view of a front part of a vehicle according to an embodiment of the present invention. The vehicle 1 consists of a four-wheeled vehicle including a pair of front wheels 3 supported by a vehicle body 2 so as to be steerable via respective front suspension systems. An engine room is formed in the front part of the vehicle body 2, and a cabin is formed behind the engine room. An internal combustion engine 4 for powering the front wheels 3 is housed in the engine room. A driver's seat is provided on a front left side part of the cabin, and a steering device 10 for steering the front wheels 3 is provided between the driver's seat and the front wheels 3.

The steering device 10 includes a steering wheel 11 (or a steering member) arranged in front of the driver's seat to receive a steering input from the driver. A steering shaft 12 is integrally and centrally attached to the steering wheel 11 to extend forward and downward, and is rotatably supported by the vehicle body 2 via a steering column support 13. The steering shaft 12 extends beyond the steering column support 13, and is connected, at the lower end thereof, to a rack and pinion steering gear box 14 via a clutch 20.

Figure 2:
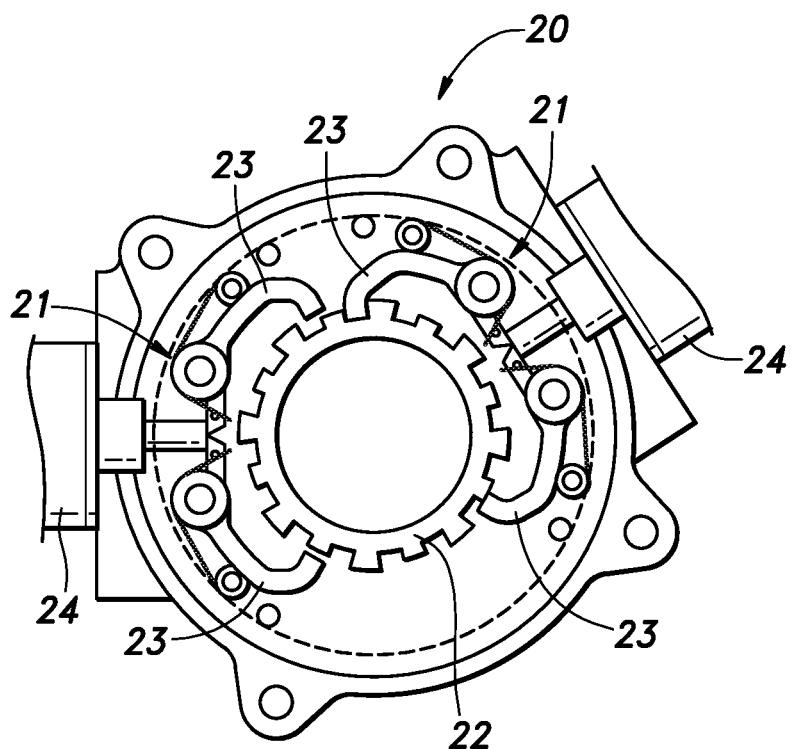
FIG. 2 is a sectional view of a clutch shown in FIG. 1.

FIG. 2 is a sectional view of the clutch 20. The clutch 20 is of a per se known construction, and includes a planetary gear mechanism (not shown in the drawing) and a lock device 21. The steering shaft 12 on the side of the steering wheel 11 is coaxially fixed to an annular internal gear of the planetary gear mechanism. The steering shaft 12 on the side of the rack and pinion steering gear box 14 is coaxially fixed to a planet carrier of the planetary gear mechanism (rotatably supporting planetary gears meshing with the annular internal gear). The lock device 21 selectively permits and prohibits the rotation of a sun gear of the planetary gear mechanism that meshes with the planetary gears.

The lock device 21 includes a locking gear 22 consisting of an external gear and configured so as to rotate integrally and coaxially with the sun gear, and a plurality of lock levers 23 each having a distal end and a proximal end, and pivotally supported at an intermediate portion adjoining the proximal end so that each lock lever 23 can pivot between an engaged position where the distal end is displaced radially inward into engagement with the locking gear 22 and a disengaged position where the distal end is displaced radially outward out of engagement with the locking gear 22. The lock levers 23 normally engage the locking gear 22 under the spring force of spring members not shown in the drawings. The lock device 21 further includes a pair of electromagnetic solenoids 24 for selectively pushing the proximal ends of the lock levers 23 in a radially inward direction so that the lock levers 23 are displaced away from the locking gear 22 against the biasing force of the spring members.

When the electromagnetic solenoids 24 are turned off so that each lock lever 23 engages a tooth of the locking gear 22, the rotational motion of the sun gear is prevented. As a result, the rotational movement of the steering wheel 11 is transmitted to the input end of the rack and pinion steering gear box 14. In other words, when the clutch 20 is engaged, the steering wheel 11 is mechanically coupled with the front wheels 3. On the other hand, when the electromagnetic solenoid 24 is turned on so that each lock lever 23 disengages from a tooth of the locking gear 22, the rotation of the sun gear is permitted. As a result, the steering wheel 11 is mechanically decoupled from the front wheels 3.

Thus, when the clutch 20 is engaged, the steering input applied to the steering wheel 11 is transmitted to the front wheels 3 as a steering output via the rack and pinion steering gear box 14. However, the clutch 20 is normally disengaged so that a steer by wire operation may be performed, and becomes engaged when the steer by wire operation cannot be performed owing to a system failure or the like.

Referring to FIG. 1, a reaction force actuator 25 for applying a reaction torque to the steering shaft 12 is provided in an upper part of the steering device 10. The reaction force actuator 25 applies a reaction torque to the steering wheel 11 when the clutch 20 is disengaged and hence the road reaction to the front wheels 3 is not transmitted to the steering shaft 12. In the present embodiment, the reaction force actuator 25 includes an electric motor, and is configured to transmit the rotational torque of the electric motor to the steering shaft 12.

A steering actuator 26 is provided in association with the steering gear box 14 to apply a steering torque to the steering gear box 14 according to the operation of the steering wheel 11. In the present embodiment, the steering actuator 26 includes an electric motor, and is configured to transmit the rotational torque of the electric motor to the rack as a thrust force via a ball screw mechanism or the like.

A steering angle sensor 31 for detecting the steering angle $\theta$ of the steering wheel 11 is provided in an upper part of the steering shaft 12, and a torque sensor 32 for detecting a steering torque T applied to the steering wheel 11 is provided in a part of the steering shaft 12 located above the reaction force actuator 25. The steering gear box 14 is provided with a pinion angle sensor 33 for detecting the rotational angle P$\theta$ of the pinion. The reaction force actuator 25 is provided with a rotation angle sensor 34 (resolver) for detecting the rotational angle M$\theta$ of the electric motor. The steering actuator 26 is further provided with a stroke sensor 35 for detecting the stroke S of the rack. Detection signals of these sensors 31 to 35 are forwarded to a control unit 40 provided in a suitable part of the vehicle 1.

When the clutch 20 is engaged, a steering of the steering wheel 11 causes a corresponding steering of the front wheels 3 where a fixed relationship between the steering angle $\theta$ of the steering wheel 11 and the steering angle $\Theta$ of the front wheels 3 is maintained owing to the mechanical coupling existing between the steering wheel 11 and the front wheels 3. When the clutch 20 is disengaged, the steering angle $\theta$ (steering input angle) of the steering wheel 11 is detected by the steering angle sensor 31, and the control unit 40 drives the steering actuator 26 such that the front wheels 3 are steered by a corresponding steering angle $\Theta$ (steering output angle). In other words, a steer by wire steering operation is performed in this case. Because the steering wheel 11 and the front wheels 3 are not mechanically coupled to each other, the relationship between the steering angle $\theta$ of the steering wheel 11 and the steering angle $\Theta$ of the front wheels 3 can be changed freely according to various parameters such as the vehicle speed.

The rotational angle P$\theta$ of the pinion detected by the pinion angle sensor 33 and the stroke S of the rack detected by the stroke sensor 35 correspond to the steering angle $\Theta$ of the front wheels 3 in a fixed relationship. Further, as described above, when the clutch 20 is engaged, the steering angle $\Theta$ of the front wheels 3 corresponds to the steering angle $\theta$ of the steering wheel 11 in a fixed relationship, and when the clutch 20 is in the disengaged state, the steering angle $\Theta$ is related to the steering angle $\theta$ in a relationship controlled by the control unit 40.

Figure 3:
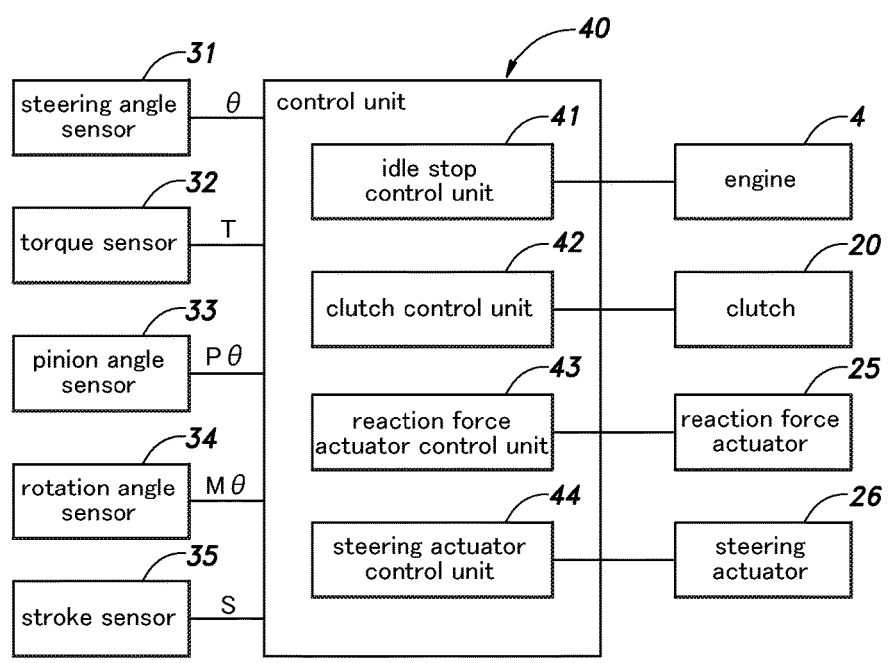
FIG. 3 is a functional block diagram of a control system shown in FIG. 1.

FIG. 3 is a functional block diagram of the control unit 40. The control unit 40 consists of an electronic circuit unit including a CPU, RAM, ROM and an input/output interface. As discussed above, the sensor signals are forwarded to the control unit 40 from the steering angle sensor 31, the torque sensor 32, the pinion angle sensor 33, the rotation angle sensor 34, and the stroke sensor 35. The control unit 40 includes, as functional units, an idle stop control unit 41 that controls stopping and restarting of the engine 4, a clutch control unit 42 that controls the operation of the clutch 20, a reaction force actuator control unit 43 for driving and controlling the reaction force actuator 25, and a steering actuator control unit 44 that drives and controls the steering actuator 26.

The idle stop control unit 41 performs an idle stop control to stop the engine 4 when a predetermined idle stop condition is satisfied and to restart the engine 4 when a predetermined restart condition is satisfied. The idle stop condition for stopping the engine 4 is satisfied, in the illustrated embodiment, if all of the conditions that the ignition switch is ON, that the engine rotational speed is a predetermined value or higher, that the vehicle speed is a predetermined value or lower, that the accelerator pedal stroke is substantially 0, that the shift position is other than the P, R or N range, that the brake switch is ON, that the steering angle of the steering wheel is less than a certain limit value (such as 90 degrees), and that the remaining battery level is equal to or greater than a predetermined value are satisfied. On the other hand, the restart condition for restarting the engine 4 is satisfied, in the illustrated embodiment, if at least one of the conditions that the brake switch is turned off, that the accelerator pedal stroke has reached a predetermined value or is greater, and that the shift position is N, R or L is satisfied.

The mode of operation of the illustrated embodiment is described in the following. When the engine 4 is started by the driver of the vehicle, the clutch control unit 42 supplies electric current to the electromagnetic solenoid 24 to disengage the clutch 20. When the engine 4 is stopped by the driver of the vehicle, the clutch control unit 42 stops the supply of the electric current to the electromagnetic solenoid 24, and brings the clutch 20 into engagement. During the time the idle stop control unit 41 stops the engine 4, the clutch control unit 42 continues to supply the electric current to the electromagnetic solenoid 24 to maintain the clutch 20 in the disengaged state.

When the clutch 20 is disengaged, the steering actuator control unit 44 drives and controls the steering actuator 26 so that the front wheels 3 are steered by a steering angle $\Theta$ corresponding to the steering angle $\theta$ applied to the steering wheel 11. During an idle stop where the idle stop control unit 41 stops the engine 4, the steering actuator control unit 44 does not supply electric current to the steering actuator 26 to avoid electric current from being consumed by the steering actuator 26 and excessively drawn from the onboard battery. Therefore, during an idle stop, the steering wheel 11 may be turned independently from the front wheels 3. When the idle stop is terminated, and the idle stop control unit 41 restarts the engine 4, the steering actuator control unit 44 resumes the control of the steering actuator 26 such that the front wheels 3 are steered (from the angular position that has been fixed since the start of the current idle stop) to a steering angle $\Theta$ corresponding to the steering angle $\theta$ of the steering wheel 11 at the time of the termination of the idle stop.

During the time where the clutch 20 is disengaged, the reaction force actuator control unit 43 drives and controls the reaction force actuator 25 so as to apply a reaction torque to the steering shaft 12 according to the operation of the steering wheel 11. Even during the idle stop where the idle stop control unit 41 stops the engine 4, the reaction force actuator control unit 43 continues to drive and control the reaction force actuator 25.

During an idle stop, the reaction force actuator control unit 43 continues to drive and control the reaction force actuator 25, but does not prevent the steering of the steering wheel 11. Also, when the steering angle $\theta$ deviates from the corresponding steering angle $\Theta$ of the front wheels 3 during an idle stop, the reaction force actuator control unit 43 does not drive or control the reaction force actuator 25 so that the reaction force actuator control unit 43 does not cause the steering angle $\Theta$ of the front wheels 3 to correspond to the steering angle $\theta$ of the steering wheel 11. Therefore, during the idle stop, the relationship between the steering angle $\theta$ and the turning angle $\Theta$ may deviate from the normal relationship or shift from each other in either direction.

Therefore, if the steering wheel 11 is turned during an idle stop, because the steering angle of the front wheels 3 remains fixed from the start of the idle stop, the front wheels 3 may be steered in an unexpected way upon termination of the idle stop. Therefore, it is desirable to minimize any ill effect that could be caused by an unexpected steering action that can occur upon termination of the idle stop.

In the illustrated embodiment, the idle stop control unit 41 determines a change $\Delta\theta$ in the steering angle $\theta$ from the start of an idle stop, and compares the change $\Delta\theta$ with a predetermined engine restart threshold value $\Delta\theta$th. If the change $\Delta\theta$ exceeds the engine restart threshold value $\Delta\theta$th, the idle stop is terminated. Also, when the steering torque T applied to the steering wheel 11 becomes equal to or greater than a predetermined value (2 Nm, for example) or a steering angular velocity $d\theta/dt$, which is a time differential of the steering angle $\theta$, is equal to or greater than a predetermined value (90 degrees/s, for example), the idle stop is terminated.

If any one of these restart conditions or any one of the previously mentioned restart conditions is satisfied, the idle stop control unit 41 restarts the engine 4. When the idle stop is terminated and the engine 4 is restarted, the steering actuator control unit 44 resumes the drive control of the steering actuator 26, and steers the front wheels 3 to the steering angle $\Theta$ corresponding to the steering angle $\theta$ of the steering wheel 11. In particular, by terminating the idle stop when the steering wheel 11 is turned by more than the engine restart threshold value $\Delta\theta$th during the idle stop, an unexpected abrupt steering action is prevented from occurring upon termination of the idle stop.

If the engine restart threshold value $\Delta\theta$th is selected as a relatively small value, the abrupt steering of the front wheels 3 upon termination of an idle stop can be minimized, but the power consumption by the steering actuator 26 during an idle stop increases because the idle stop can be terminated by slight turning of the steering wheel 11. Conversely, if the engine restart threshold value $\Delta\theta$th is selected as a large value, the abrupt steering of the front wheels 3 upon termination of an idle stop is more likely to occur, but the power consumption by the steering actuator 26 during an idle stop decreases because the idle stop cannot be terminated by slight turning of the steering wheel 11.

According to the illustrated embodiment, the engine restart threshold value $\Delta\theta$th is varied depending on the state of the front wheels 3 so that the power consumption of the steering actuator 26 can be minimized during an idle stop while minimizing the ill effect that could otherwise occur if the engine restart threshold value $\Delta\theta$th is increased.

Figure 4C:
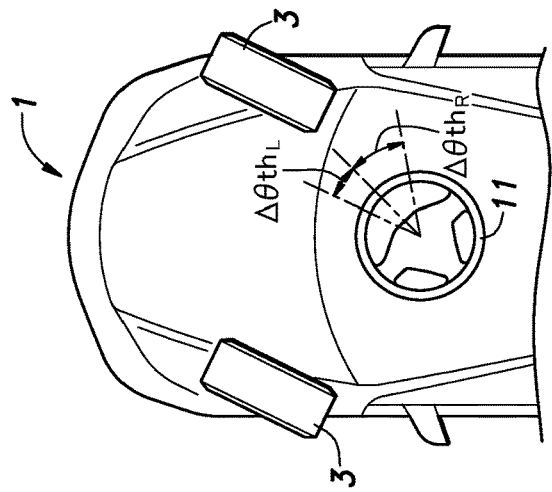
FIGS. 4a to 4c are schematic views illustrating restart conditions of an idle stop operation performed by the control system shown in FIG. 3.
Figure 4B:
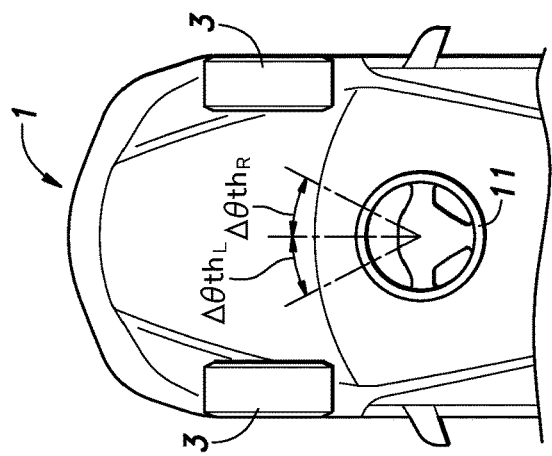
Figure 4A:
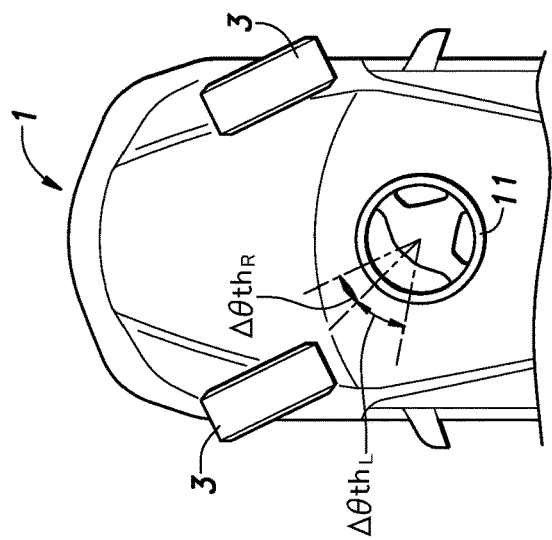

FIG. 4 is an explanatory diagram of the restart condition of the idle stop control performed by the control unit 40. FIG. 4a shows a case where the front wheels 3 are steered to the left at the start of the idle stop, FIG. 4b shows a case where the front wheels 3 are substantially in a straight ahead position when the idle stop is started, and FIG. 4c show the case where the front wheels 3 are steered to the right when the idle stop is started.

As shown in FIG. 4b, suppose that when the idle stop is started, the front wheels 3 are in a substantially straight ahead position, or that the absolute value $|\theta s|$ of the steering angle $\theta$ of the steering wheel 11 at the start of the idle stop (initial steering angle $\theta s$) is equal to or smaller than a predetermined value (20 degrees, for example). In this case, the engine restart threshold value $\Delta\theta$th is selected as a base value (30 degrees, for example) without regard to if the steering wheels 11 is turned either to the left or to the right. Therefore, in this case, if the steering wheel is turned by more than the value corresponding to the base value (30 degrees) in either direction, the idle stop is terminated, and the engine is restarted.

As shown in FIG. 4a, suppose that when the idle stop is started, the front wheels 3 are directed to the left, and the initial steering angle $\theta s$ is greater than the predetermined value (20 degrees, in this case). In this case, the engine restart threshold value $\Delta\theta$th is selected so that the engine restart threshold value $\Delta\theta$thL for a leftward steering (an additive steering angle) is greater than the engine restart threshold value $\Delta\theta$thR for a rightward steering (a subtractive steering angle). More specifically, the engine restart threshold value $\Delta\theta$thL for a leftward steering (an additive steering angle) is greater than the base value (45 degrees, for example) while the engine restart threshold value $\Delta\theta$thR for a rightward steering (a subtractive steering angle) is smaller than the base value (15 degrees, for example).

As shown in FIG. 4c, suppose that when the idle stop is started, the front wheels 3 are directed to the right, and the initial steering angle $\theta s$ is greater than the predetermined value (20 degrees, in this case). In this case, the engine restart threshold value $\Delta\theta$th is selected so that the engine restart threshold value $\Delta\theta$thR for a rightward steering (an additive steering angle) is greater than the engine restart threshold value $\Delta\theta$thL for a leftward steering (a subtractive steering angle). More specifically, the engine restart threshold value $\Delta\theta$thR for a rightward steering (an additive steering angle) is greater than the base value (45 degrees, for example) while the engine restart threshold value $\Delta\theta$thL for a leftward steering (a subtractive steering angle) is smaller than the base value (15 degrees, for example).

Figure 5:
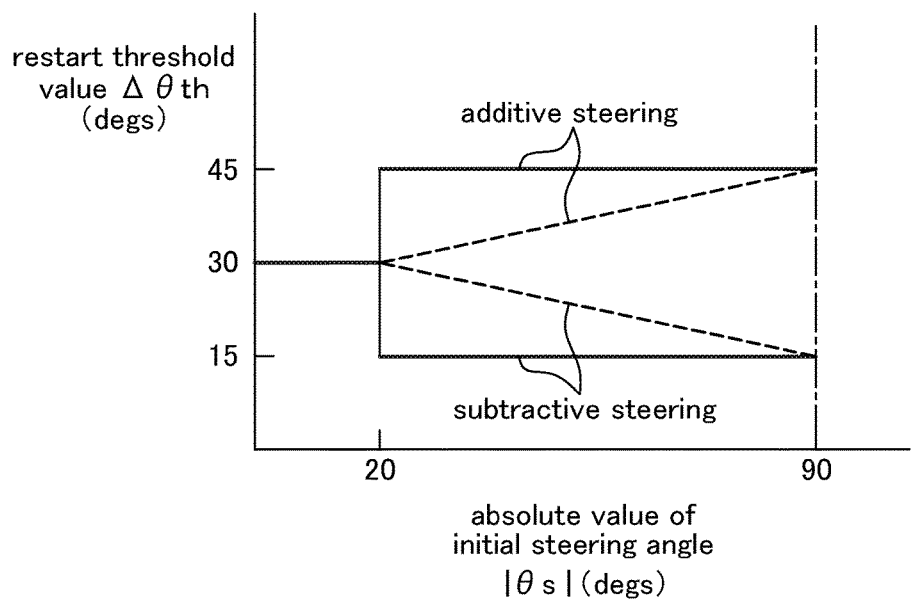
FIG. 5 is a graph showing the relationship between an initial steering angle of the steering wheel and an engine restart threshold value.

FIG. 5 is a graph showing the relationship between the steering angle of the steering wheel 11 at the start of an idle stop (initial steering angle $\theta s$) and the engine restart threshold value $\Delta\theta$th. The engine restart threshold value $\Delta\theta$th ($\Delta\theta thL$ or $\Delta\theta thR$) may be varied discretely in relation with the initial steering angle $\theta s$ as indicated by the solid lines in FIG. 5, but may also be increased in proportion to an increase in the initial steering angle $\theta s$ for the additive steering and decreased in proportion to an increase in the initial steering angle $\theta s$ for the subtractive steering as indicated by the dotted lines in FIG. 5.

In the foregoing embodiment, the engine restart threshold value $\Delta\theta th$, the initial steering angle $\theta s$ and the predetermined absolute value of the initial steering angle $\theta s$ were evaluated in terms of the steering angle $\theta$ of the steering wheel 11, but may also be evaluated in terms of the steering angle $\Theta$ of the front wheels 3 or other values associated with either of these steering angles such as the linear position of the rack and the angular position of the pinion of the rack and pinion steering gear box 14.

Although the present invention has been described in terms of a preferred embodiment thereof, it is obvious to a person skilled in the art that various alterations and modifications are possible without departing from the scope of the present invention.

The invention claimed is:

1. A control system for a vehicle incorporated with a steer by wire steering device for steering a road wheel mechanically decoupled from a steering member by using a steering actuator, the control system comprising:
   an idle stop control unit for starting an idle stop operation to stop an engine mounted on the vehicle when a prescribed idle stop condition is satisfied, and restarting the engine when a prescribed restart condition is satisfied;
   a steering input angle sensor for detecting a steering input angle of the steering member;
   an actuator control unit for controlling the steering actuator so as to cause the road wheel to be steered at an angle commanded by the steering input angle of the steering member, the actuator control unit being configured to terminate an operation of the steering actuator during the idle stop operation started by the idle stop control unit; and
   a steering output angle sensor for detecting a steering output angle of the road wheel;
   wherein the restart condition is satisfied when an absolute value of a change of the steering input or output angle from a start of the idle stop operation is greater than an engine restart threshold value; and
   wherein, if an absolute value of the steering input or output angle at the start of the idle stop operation is equal to or greater than a prescribed value, the engine restart threshold value is given as a first value for a steering operation during the idle stop operation in a same direction as the steering input angle at the start of the idle stop operation, and as a second value for a steering operation during the idle stop operation in an opposite direction to the steering input angle at the start of the idle stop operation, the second value being smaller than the first value.

2. The control system according to claim 1, wherein if the absolute value of the steering input or output angle at the start of the idle stop operation is smaller than the prescribed value, the engine restart threshold value is given as a base value intermediate between the first value and the second value.

3. The control system according to claim 1, wherein the first value and the second value are fixed values without regard to the absolute value of the steering input or output angle at the start of the idle stop operation.

4. The control system according to claim 1, wherein the first value increases with an increase in the absolute value of the steering input or output angle at the start of the idle stop operation.

5. The control system according to claim 4, wherein the second value decreases with an increase in the absolute value of the steering input or output angle at the start of the idle stop operation.

6. The control system according to claim 1, wherein the idle stop control unit does not start the idle stop operation if the absolute value of the steering input or output angle is greater than a limit value which is greater than the prescribed value.

* * * * *